US006468629B1

United States Patent
Lodder

(10) Patent No.: US 6,468,629 B1
(45) Date of Patent: Oct. 22, 2002

(54) MULTILAYER PLATE-SHAPED LINING MATERIAL

(75) Inventor: Martin Lodder, Burgwedel (DE)

(73) Assignee: Benecke-Kaliko Aktiengesellschaft, Hannover (DE)

( * ) Notice: Subject to any disclaimer, the term of this patent is extended or adjusted under 35 U.S.C. 154(b) by 0 days.

(21) Appl. No.: 09/554,809

(22) PCT Filed: Nov. 11, 1998

(86) PCT No.: PCT/DE98/03380

§ 371 (c)(1),
(2), (4) Date: May 19, 2000

(87) PCT Pub. No.: WO99/26784

PCT Pub. Date: Jun. 3, 1999

(30) Foreign Application Priority Data

Nov. 24, 1997 (DE) ..................... 297 20 702 U

(51) Int. Cl.[7] .................................. B32B 3/12
(52) U.S. Cl. .................. 428/158; 428/141; 428/159; 428/172; 428/318.4
(58) Field of Search ................. 428/172, 158, 428/159, 160, 318.4, 318.8, 180, 208, 141

(56) References Cited

U.S. PATENT DOCUMENTS

| 4,303,695 A | * | 12/1981 | McCann et al. | ............ | 428/172 |
| 5,242,738 A | * | 9/1993 | Furuya et al. | ............... | 428/172 |
| 5,256,465 A | * | 10/1993 | Martin et al. | ............... | 428/158 |

FOREIGN PATENT DOCUMENTS

| DE | 30 28 664 | 3/1981 |
| DE | 247 911 | 4/1986 |
| DE | 38 42 846 | 6/1990 |
| DE | 40 24 274 | 2/1992 |
| DE | 196 19 892 | 6/1997 |
| EP | 0 429 020 | 11/1990 |
| EP | 0 713 759 | 5/1995 |
| EP | 0 669 195 | 8/1995 |
| EP | 0 879 844 | 5/1998 |

* cited by examiner

Primary Examiner—Donald J. Loney
(74) Attorney, Agent, or Firm—Collard & Roe, P.C.

(57) ABSTRACT

This invention concerns a multilayer lining material in the form of sheeting which can be cut to size. Such lining materials are used, for example, as floor plates to cover the loading areas of utility vehicles and as floorboards for passenger vehicles. The lining material can be cut to size, so it can also be punched to obtain a shape corresponding to the loading area.

Figure 1:
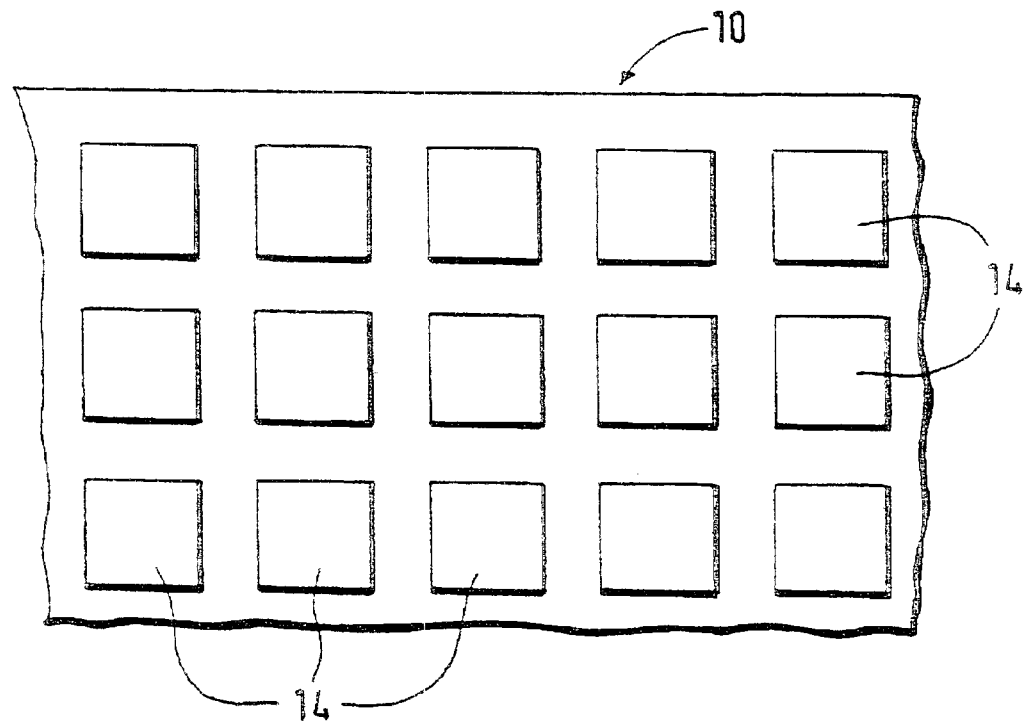

A known lining material which is used as a floor plate consists of a wood fiberboard on the bottom side. A laminated material consisting of a TPO compact film (TPO= thermoplastic polyolefins) with a laminated nonwoven bonded to the wood fiberboard. Thus, the lining material consists of three layers.

The known lining material has a complicated design because first a nonwoven must be laminated to the TPO compact film and then the wood fiberboard must be glued to the laminated material consisting of the TPO compact film and the nonwoven. This makes production very cost-intensive. In addition, the finished lining material has a high weight due to the wood fiberboard used in it in particular. Furthermore, the sound insulating effect is unsatisfactory, and finally, disposal of an old floor plate that is no longer needed poses problems because it is made of different materials.

The object of this invention is to create a lightweight and yet strong lining material which can be manufactured inexpensively. In addition, the lining material should have a good sound insulating effect and it should be easy to recycle.

This object is achieved according to the present invention by the features of Patent claim 1.

3 Claims, 1 Drawing Sheet

MULTILAYER PLATE-SHAPED LINING MATERIAL

According to this invention, the lining material is formed by a deep-drawn TPO compact film fixedly arranged on a backing layer, where the backing layer consists of polypropylene particle foam. Such a lining material is sturdy and stable but nevertheless has a low weight. It can be manufactured easily and inexpensively.

According to an advantageous embodiment of the present invention, the lining material consists of the deep-drawn TPO film, which is foam backed with a rigid polypropylene particle foam after deep drawing.

It is advantageous here that production can be reduced to a single operation and is especially simple and inexpensive, because deep drawing and foam backing can be performed in a single mold. No separate bonding operations are necessary.

Another advantageous embodiment of this invention consists of the fact that the TPO compact film is adhesively bonded to the backing layer by a heat-activated adhesive bond. Thus, the two-layer lining material can be produced easily by simply pressing over the entire area under the influence of temperature.

Another advantageous embodiment of this invention consists of the fact that the TPO compact film has a structured surface. This can easily be accomplished by the embossing the TPO compact film in the mold during deep drawing, which produces a structured surface.

An especially advantageous embodiment of this invention provides for recycled TPO material (also known as TPO regenerate) to be present in both the TPO film and the polypropylene particle foam.

Such recycled TPO material is available at practically no cost as a waste product, and instead of disposing of these waste products, they can be used in an advantageous manner to produce lining materials.

Such a lining material thus forms a product which is made of one class of materials, and such a product can be recycled much more easily than the lining material described in the preamble.

Another advantageous embodiment of this invention consists of the fact that a thin grainy, colored cover film of a fresh TPO mixture is laminated to the top side of the TPO film. It is thus possible to impart the colors desired by consumers to the surface of the lining material.

Figure 2:
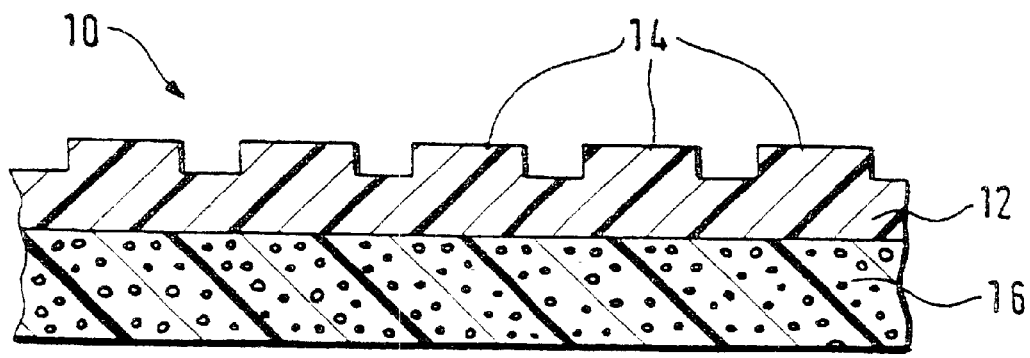

The present invention will be explained in greater detail below on the basis of the embodiment illustrated in the drawings, which show:

FIG. 1: a top view of part of a lining material in the form of a floor plate, and FIG. 2: a cross-sectional view of the lining material according to FIG. 1.

FIGS. 1 and 2 of the drawings show a lining material in the form of floor plate 10 which may serve as the covering for a loading area in a commercial vehicle, for example. Floor plate 10 consists of an upper TPO film 12 and a bottom polypropylene particle foam layer 16. TPO film 12 is deep-drawn in a mold and then a rigid foam backing is produced with polypropylene particle foam 16.

During deep drawing of the TPO film 12, it may be embossed in the mold to obtain a structured surface. In the drawings, the structured surface is produced by square elevations 14.

Recycled TPO material is used in both the TPO film 12 and in the polypropylene particle foam layer 16, so that floor plate 10 is manufactured of one class of materials on the whole and thus can be recycled easily.

The method used to manufacture floor plate 10 may be reduced in an advantageous manner to one operation, because the deep-drawing and the foam backing can be done in a single mold.

What is claimed is:

1. A multilayer lining material in the form of sheeting that can be cut to size, characterized in that the lining material (10) is formed by a deep-drawn TPO film (12) (TPO= thermoplastic polyolefin) fixedly arranged on a backing layer (16); the backing layer (16) is made of polypropylene particle foam; the TPO film (12) forming the lining material (10) is backed with a rigid polypropylene particle foam (16) after being deep drawn; the TPO film (12) has a structured surface (14) produced by embossing the TPO film (12) during deep-drawing; both the TPO film (12) and the polypropylene particle foam (16) contain recycled TPO material and thus form a single class of material; and a colored cover film of a fresh TPO mixture is laminated to the side of the TPO film (12) facing away from the polypropylene particle foam layer.

2. A lining material according to claim 1, characterized in that the TPO film (12) is adhesively bonded to the backing layer (16) by an adhesive bond produced under the influence of temperature.

3. A lining material according to claim 1, characterized in that the cover film is grainy.

* * * * *